United States Patent

Roualdes et al.

[11] Patent Number: 5,855,980
[45] Date of Patent: Jan. 5, 1999

[54] FABRIC FOR CLOTHING INDUSTRY AND INTERIOR FURNISHING

[76] Inventors: Bruno Roualdes; Santina Coerezza, both of 16 rue du Dragon, 75006-Paris, France

[21] Appl. No.: 624,425
[22] PCT Filed: Dec. 23, 1994
[86] PCT No.: PCT/FR94/01526
  § 371 Date: May 15, 1996
  § 102(e) Date: May 15, 1996
[87] PCT Pub. No.: WO95/17834
  PCT Pub. Date: Jul. 6, 1995

[30] Foreign Application Priority Data

Dec. 30, 1993 [FR] France ..... 9315929

[51] Int. Cl.$^6$ ..... B05D 1/14
[52] U.S. Cl. ..... 428/90; 442/6; 442/12; 442/16; 442/290
[58] Field of Search ..... 428/90, 256, 285; 442/6, 12, 16, 290

[56] References Cited

FOREIGN PATENT DOCUMENTS

| 0481106 | 4/1992 | European Pat. Off. . |
| 2088105 | 1/1972 | France . |
| 9220533 | 11/1992 | WIPO . |

*Primary Examiner*—James J. Bell
*Attorney, Agent, or Firm*—Rines and Rines

[57] ABSTRACT

The invention relates to a fabric with a laminate structure comprising flexible materials such as skins, woven fabrics and/or paper, and at least one metal material. The fabric is manually deformable without high elastic or plastic recovery. According to the invention, the structure consists of a substantially planar metal core essentially comprising a non-ferrous metal, this core being less than 0,15 mm thick and having the firmness necessary to provide a flexible stiffness, the thickness and metallurgical treatment being adapted to the weight of the flexible materials, and a layer of flexible materials bonded to either side of the core. The fabric of the invention is for use in the clothing industry, furnishings, interior decoration and stage designing.

10 Claims, No Drawings

FABRIC FOR CLOTHING INDUSTRY AND INTERIOR FURNISHING

BACKGROUND OF THE INVENTION

The present invention relates to a fabric for garment-making and decoration, more particularly a fabric intended for clothing, furnishing, decoration and scenography.

The main object of the present invention is to obtain a pliant material, having an aesthetic appearance on the outside, keeping its shape after deformation and therefore having no concomitant spring-back or plastic recovery. Its pliancy must be such that it can be easily deformed by hand.

With such a material, it is therefore possible to mark folds and to vary the shape many times in succession, something which enable the final fabric to be used again in clothing, furnishing, decoration, scenography or equivalent, which fabric can thus change aesthetic appearance in its geometrical perception, including sculptural perception.

Studies carried out have resulted in a complex fabric, combining pliant materials, such as skin, woven cloth or paper, these fabrics being given structure by a metallic core, providing a consistency in its pliant rigidity in such a way that the fabric exhibits properties of pliancy, of easy deformation without concomitant spring-back and of good strength under its own weight.

PRIOR ART

Various documents are known in the field. For example, Document EP-A-0,481,106 describes a decorative element comprising a layer of magnetic rubber, a layer of aluminum and a layer of leather, making it possible to give said element various shapes. After giving said element the desired shape, the layer of magnetic rubber enables the element to be easily fixed to any ferrous material. Such a decorative element, by the very fact of the required thickness, cannot be used for clothing needs and its use is quite limited. What is more, it does not exhibit the correct ability to be bent through a large angle.

Document FR-A-2,088,105 describes an elastically deformable strip which enables resilient supports to be made. This document is therefore contrary to the spirit of the invention for which there must be no spring-back or plastic recovery.

As for Document EP-A-0,585,288, this describes a flexible laminate made of plastic which can bear a holographic image.

All these documents are therefore remote from the present invention.

SUMMARY OF THE INVENTION

The invention therefore relates to a fabric exhibiting a laminated structure comprising pliant material, such as skin, woven cloth and/or paper, and at least one metallic material, this fabric being able to be deformed by hand without appreciable spring-back or plastic recovery.

According to the invention, this structure comprises:
a substantially planar metallic core essentially comprising a non-ferrous material, this core having a thickness less than 0,15 mm providing consistency for pliant ridigity, and the thickness and metallurgical treatment of which are adapted to the weight of the pliant materials; and
a layer of pliant material bonded on each side of the core.

According to a first embodiment, the metallic core is formed by a sheet of non-ferrous material, which sheet may possibly be made in the form of a simple or woven grid.

According to another embodiment, the core is formed by a layer of particulate metallic elements, of the type comprising flakes, lamellae, shims or single wire in a pliant binder.

Preferably, the core is firstly covered, at least partially, with a film made of a plastic, such as high density polyethylene, having a thickness of approximately 0,05 mm, this film adhering to the core.

Tests have shown that the non-ferrous metal must have, preferably, a very high purity and be chosen from the group comprising aluminum, copper, tin, bronze, brass, silver, gold, beryllium and alloys of these.

DETAILED DESCRIPTION OF THE INVENTION

The invention will be better understood, and further aims, advantages and characteristics thereof will appear more clearly on reading the following description of preferred embodiment which are given in a non limiting way.

As a person skilled in the art will have understood, the fabric according to the invention essentially comprises a laminated structure comprising at least three layers, that is to say a metallic core arranged between two sheets or layers formed by a conventional pliant material, such as a skin, a woven cloth or a decorative paper.

The three layers are bonded together. The bonding agents which can be used are those especially employed in the footwear and clothing industry. A widely-used bonding agent will preferably be a stabilized bonding agent not requiring activation. It is stabilized in its consistency determining its mechanical interaction with the layers. This is the case for a double-side adhesive applied by transfer under pressure. This bonding agent will therefore be neither flowing nor diffusing, but will penetrate partially into the coating by pressure, which penetration will determine, in a way complementary to the adhesive power, a mechanical keying into the coating. The bonding agent will furthermore have a binder effect on the other components of the final fabric.

The thickness of the transferred bonding agent layer is between approximately 20 $\mu$m and 2 mm and is, preferably, of the order of approximately 50 $\mu$m in order to favor this mechanical keying and in order to limit the mass of bonding agent, in such a way that this mass has little impact on the characteristics of the final fabric which must exhibit a pliant rigidity, without concomitant spring-back or plastic recovery. Of course, this mass of bonding agent may be reduced by discontinuous deposition in the form of spots, for example, uniformly distributed over the entire surface to be bonded, or else in the form of a grid determining areas without bonding agent. In illustrative embodiments, between approximately 2 and 6 grams of bonding agent per $m^2$ have been used.

Furthermore, the bonding must be chosen so as to exhibit at the following properties: be barely sensitive or insensitive to the substances used for subsequently cleaning the final fabric; not migrate excessively through the coating, not adversely affect either the pliancy or the hardness of the final fabric after drying, not spring-back or plastic recovery after bending the final fabric many times.

It will be understood that this bonding agent may be formed by an acrylic adhesive or by a solvent and elastomer, these being sprayed, but this information in no way implies a limiting character. Indeed, chemical bonding or thermobonding may be completely favorably used, depending on the various properties desired of the final fabric and on the actual type pliant coating chosen. In any case, the bonding agent has a binder effect with regard to the components of the final fabric.

The metallic core is substantially planar and is made of non-ferrous metal. This metal, if possible exhibiting very high purity, is favorably chosen from the group comprising aluminum, copper, tin, bronze, brass, silver, gold, beryllium and alloys of these. However, aluminum is the preferred metal since it is one of the least dense and most resistant to resistant to repeated bending cycles, especially when its purity is higher than 99%, and is less expensive.

This metal will receive at least one prior metallurgical treatment chosen from those comprising a thermal annealing operation, degreasing, anodization, deoxidation and mixtures of these treatments. Obviously this treatment must be adapted, of course, to the aesthetic appearance of the final fabric, but most of all to the type of bonding chosen for the coating.

The thickness of the core is between approximately 30 $\mu$m and 90 $\mu$m. According to these applications, the preferred thickness be of the order of approximately 30 $\mu$m or 70 $\mu$m.

The core may be made in various ways. It may, for example, be made in the from of a continuous thin sheet of the chosen non-ferrous metal, but it may also be made in the form of a simple or woven grid. It may also be formed by a layer of particulate metal elements, of the type comprising flakes, lamellae, shims or single wires which may or not be woven, these being embedded in a pliant binder, such as a synthetic resin, latex or an acrylic in solution.

The metal, the embodiment and the associated heat treatment form a substantially inseparable whole, in order to obtain the desired properties, especially a very high resistance to repeated bending cycles, without crumpling, or shearing, or appreciable tearing or work hardening.

It should be noted that the core may favorably consist of several types of the aforementioned embodiments combined together so as, for example, to strengthen the ends of the final fabric, while at the same time allowing high pliancy in the areas presumed to be the most stressed under multiple bending.

With the aim of improving these latter properties, it is possible, but not absolutely essential, to coat, at least partially, the metallic core with a film of plastic before bonding the pliant layer. Such a film may be of a material coming from the petrochemical industry, for example a high-density polyethylene or a polyester, having a thickness of the order of approximately 50 $\mu$m. This film will be able to adhere naturally to the core or else be bonded to the depending on its nature.

The associated pliant layer may favorably be a skin, a woven cloth or a nonwoven fabric, or paper, depending on the final aesthetic appearance desired. However, it is obvious that a material not having a creasing memory is preferred. A nonwoven material obtained by flocking is also preferred, since it exhibits a very high pliancy even when very thin. It will also be possible for this layer to consist of paper, which may or may not be agglomerated. When the layer comprises a layer of skin, such will have a thickness of between approximately 0,3 and 1 mm and, preferably, of the order of approximately 0,6 mm, so as to preserve the pliancy of the final fabric.

In order to avoid the problem of transparency at certain points, of instability or of non-uniformity of the coloring of the fabric, it may be judicious to color the aforementioned film or to add a very thin lining in the lamination between the core and the coating. It will also be possible to add a thin film layer to further reduce the creasing memory of the final fabric.

A person skilled in the art will have understood that a final fabric is thus obtained whose shape may be easily modified by hand many times in a substantially stable manner, that is to say without appreciable spring-back or plastic recovery. It should be noted that such a fabric may possibly constitute, furthermore, a Faraday cage.

Although a description has been given of what are currently regarded as being the preferred embodiments of the present invention, it is obvious that a person skilled in the art will be able to make various changes and modifications without departing from the scope of the present invention as defined by the appended claims.

What we claim is:

1. A fabric exhibiting a laminated structure comprising pliant materials, of skin, woven cloth and/or paper, and at least one meterial, said fabric being able to be deformed by hand without appreciable spring-back or plastic recovery, said structure comprising:

a substantially planar metallic core essentially comprising a non-ferrous metal, said core having a thickness less than 0,15 mm providing consistency for pliant rigidity, and the thickness and metallurgical treatment of which are adapted to the weight of said pliant material, and a layer of said pliant material bonded on each side of said core.

2. A fabric according to claim 1, wherein said metallic core is formed by a sheet of said non-ferrous metal.

3. A fabric according to claim 2, wherein said sheet is made in the form of a woven grid.

4. A fabric according to claim 1, wherein said core is formed by a layer of particulate metallic elements, of the type comprising flakes, lamellae, shims or single wires, embedded in a pliant binder.

5. A fabric according to claim 1, wherein the thickness of said core is between approximately 30 and 90 $\mu$m.

6. A fabric according to claim 1, wherein said metallurgical treatment comprises at least one treatment chosen from the group comprising a thermal annealing operation, degreasing, anodization, deoxidation and mixtures of these treatments.

7. A fabric according to claim 1, wherein said layer is a flocked sheet.

8. A fabric according to claim 1, wherein said core is firstly covered, at least partially, with a film made of a plastic high-density polyethylene having a thickness of approximately 0.05 mm, said film adhering to said core.

9. A fabric according to claim 1, wherein said non-ferrous metal is of very high purity type, chosen from the group comprising aluminum, copper, tin, bronze, brass, silver, gold, beryllium and alloys of these.

10. A fabric according to claim 1, wherein the bonding of said layer to said core is carried out by means of an acrylic adhesive, by spraying a solvent and elastomer, by chemical bonding or by thermobonding.

\* \* \* \* \*